United States Patent
Hsieh et al.

(10) Patent No.: US 7,636,131 B2
(45) Date of Patent: Dec. 22, 2009

(54) VIDEO DATA PROCESSING METHOD AND APPARATUS FOR PROCESSING VIDEO DATA

(75) Inventors: Ming-Jane Hsieh, Taipei (TW); Yi-Shu Chang, Hsin-Chu Hsien (TW); Te-Ming Kuo, Hsin-Chu Hsien (TW)

(73) Assignee: Realtek Semiconductor Corp., Hsinchu (TW)

( * ) Notice: Subject to any disclaimer, the term of this patent is extended or adjusted under 35 U.S.C. 154(b) by 577 days.

(21) Appl. No.: 11/161,847

(22) Filed: Aug. 18, 2005

(65) Prior Publication Data
US 2006/0038922 A1   Feb. 23, 2006

(30) Foreign Application Priority Data
Aug. 19, 2004   (TW) .............................. 93124972 A

(51) Int. Cl.
*H04N 9/64* (2006.01)
*G09G 5/00* (2006.01)
*G06F 12/02* (2006.01)

(52) U.S. Cl. .................. 348/716; 345/543; 345/631

(58) Field of Classification Search .......... 348/564, 348/714, 716, 718, 565, 567, 568; 711/147–153; 345/631, 543, 541, 535; 375/240.25

See application file for complete search history.

(56) References Cited

U.S. PATENT DOCUMENTS

| | | | | |
|---|---|---|---|---|
| 5,818,434 A | * | 10/1998 | Yamamoto et al. | 345/565 |
| 6,058,459 A | * | 5/2000 | Owen et al. | 711/151 |
| 6,310,657 B1 | * | 10/2001 | Chauvel et al. | 348/569 |
| 6,369,855 B1 | * | 4/2002 | Chauvel et al. | 348/423.1 |
| 6,417,886 B1 | * | 7/2002 | Tariki | 348/384.1 |
| 6,462,744 B1 | * | 10/2002 | Mochida et al. | 345/543 |
| 6,486,888 B1 | * | 11/2002 | Fushiki et al. | 345/592 |
| 6,774,918 B1 | * | 8/2004 | Muth | 715/716 |
| 6,885,392 B1 | * | 4/2005 | Mancuso et al. | 348/36 |
| 6,954,210 B2 | * | 10/2005 | Nishi | 345/565 |
| 7,119,849 B2 | * | 10/2006 | Yui et al. | 348/564 |
| 7,129,993 B2 | * | 10/2006 | Park | 348/569 |
| 7,330,196 B2 | * | 2/2008 | Ishihara | 345/631 |
| 2002/0106025 A1 | * | 8/2002 | Tsukagoshi et al. | 375/240.16 |
| 2003/0210248 A1 | * | 11/2003 | Wyatt | 345/541 |
| 2004/0080512 A1 | * | 4/2004 | McCormack et al. | 345/543 |
| 2004/0190632 A1 | * | 9/2004 | Cismas | 375/240.26 |

* cited by examiner

*Primary Examiner*—Victor Kostak
(74) *Attorney, Agent, or Firm*—Thomas, Kayden, Horstemeyer & Risley

(57) ABSTRACT

A video data displaying device is disclosed. The video data displaying device is used to drive a displayer according to a first display data set to display a first picture, the displaying device comprises a memory for storing the first display data set, and a display engine which is electrically connected to the memory for storing a part of the first display data set stored in the memory, wherein the display engine selects a specific display data set from the first display data set according to a display area of the displayer, and the display engine does not output the specific display data to the displayer.

20 Claims, 6 Drawing Sheets

VIDEO DATA PROCESSING METHOD AND APPARATUS FOR PROCESSING VIDEO DATA

BACKGROUND OF THE INVENTION

1. Field of the Invention

The invention relates to a video processing method and apparatus, and more particularly, to a video processing method and apparatus capable of saving bandwidth.

2. Description of the Prior Art

Following the development and popularization of consumer electronics products, video and audio entertainment products have become a large part of life. Furthermore, the progress of technology gives people more and more different entertainment choices. Taking TV for example, previously TV only received signals from broadcast TV stations, and consumers could only choose a limited number of channels. Because of cable TV, the number of channels has increased significantly and consumers have more choices. In recent years, in order to provide consumers better display quality, many display standards have been issued. Among these innovations, the most important one is the invention of digital TV, which started a brand-new field. For example, a digital TV can be utilized with a multimedia computer system, and furthermore, a digital TV has better display quality.

Generally speaking, a digital TV system utilizes a bus structure to communicate among its internal elements. Please refer to FIG. 1, which is a block diagram of a typical digital TV 10. The digital TV 10 comprises a memory 12, a front-end processor 14, a MPEG decoder 16, a display engine 17, a display panel 18, and a bus 20 to which the aforementioned elements are coupled. The memory 12 is utilized to store video data, and the memory 12 can be divided into two memory blocks 22, 24, wherein the memory block 22 is utilized to store un-decoded video data, and the memory block 24 is utilized to store decoded video data. The front-end processor 14 receives un-decoded video data from an antenna or other sources, performs pre-processing on the received video data, and stores the processed video data in the memory block 22 of the memory 12 through the bus 20. The MPEG decoder 16 then reads out the un-decoded video data from the memory block 22 of the memory 12, performs MPEG decoding, and writes back the decoded display data in the memory block 24 of the memory 12 through the bus 20. Finally, the display engine 17 reads the display data from the memory block 24, and drives the panel 18 according to the display data to display images corresponding to the digital TV signals received by the digital TV 10.

Because data transferred by the digital signal is generally quite large, the bandwidth of the bus 20 or of the memory 12 often becomes a bottleneck in the system structure of a digital TV system, and should be considered during system design. However, in a digital TV system, many features utilizing digital data processing, such as picture-in-picture (PIP), or on-screen display (OSD), often generate overlapping pictures. For example, a sub-picture covers a part of a main picture, or OSD covers a video picture, resulting in a part of the processed and decoded video data is not shown in the panel 18 because it is covered. In the above-mentioned situation, it is obvious that the bandwidth used to process the covered area is wasted, because the video data corresponding to the covered area used considerable bandwidth during decoding and processing but not shown in the panel 18.

SUMMARY OF THE INVENTION

It is therefore one of the many objectives of the claimed invention to provide a video processing method and apparatus for saving bandwidth of a bus or a memory.

According to embodiments of the invention, a video data displaying apparatus for driving a displayer to display a first picture according to a first display data set is disclosed, the apparatus comprising: a memory for storing the first display data set; and a display engine coupled to the memory for reading a part of the first display data set stored in the memory to drive the displayer, wherein the display engine selects a specific display data set of the first display data set according to a display area on the displayer, and the display data set outputted by the display engine to the displayer does not comprise the specific data set.

Furthermore, a method of processing a video data set for driving a displayer to display a first display data set is disclosed, the method comprising: storing the first display data set; selecting a specific display data set of the first display data set according to a display area on the displayer; and reading a part of the first display data set to drive the displayer to display the first picture, wherein a display data set transferred to the displayer does not comprise the specific display data set.

According to embodiments of the invention, a display apparatus is also disclosed. The display apparatus comprises a memory for storing a first set of display data; a display engine coupled to the memory, for identifying a portion of the first set of display data; and a displayer coupled to the display engine, for displaying an image according to the control of the display engine; wherein the display engine drives the displayer to display the image by reading out from the memory the first set of display data other than the identified portion.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
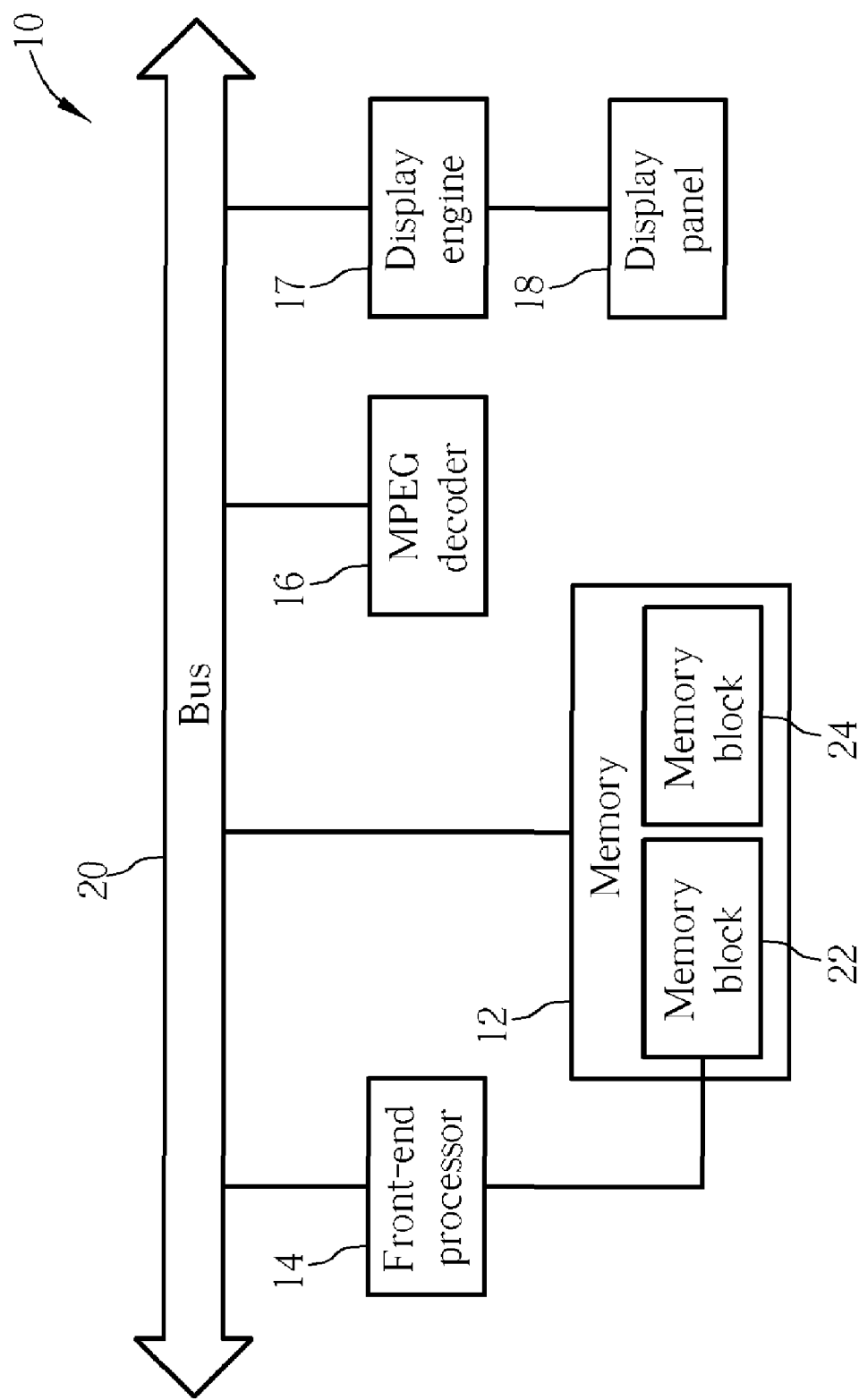
FIG. 1 is a block diagram of a typical digital TV.
Figure 2:
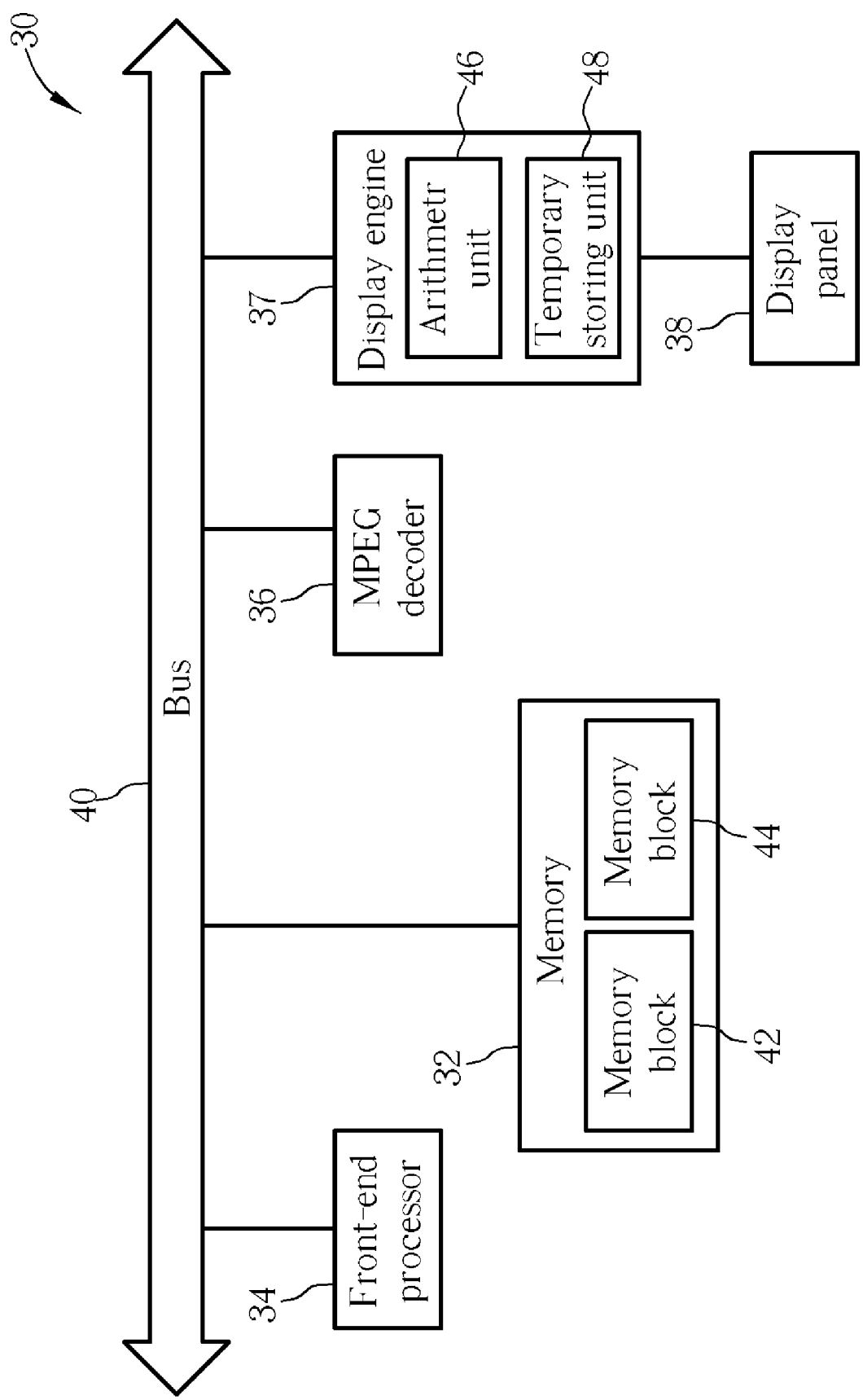
FIG. 2 is a block diagram of a digital TV according to an embodiment of the present invention.

Please refer to FIG. 2, which is a block diagram of a digital TV 30 according to an embodiment of the present invention. The digital TV 30 comprises a memory 32, a front-end processor 34, a MPEG decoder 36, a display engine 37, a display panel 38, and a bus 40. The memory 32 is used to store video data, and the memory 32 can be conceptually divided into two memory blocks 42, 44, where the memory block 42 is used to store un-decoded (raw) video data, and the memory block 44 is used to store decoded video data. For example, the memory block 44 may be a frame buffer for storing all of the display data for all pixels in a frame. The front-end processor 34 receives un-decoded video data from an antenna or other sources, pre-processes the received video data set, for example by performing a de-multiplexing operation on the received video data set, and writes the pre-processed video data set in the memory block 42 of the memory 32 through the bus 20. The MPEG decoder 36 then reads the un-decoded video data set from the memory block 42 of the memory 32, decodes the un-decoded video data set, and writes a display data set back into the memory block 44 of the memory 32 through the bus 40. Finally, the display engine 37 reads the display data set from the memory block 44, and drives the display panel 38 to display images, which corresponds to the received digital TV signal of the digital TV 30, according to the display data set. Please note that in this embodiment, the decoder 36 conforms to MPEG standard (such as MPEG2 or MPEG4). However, those skilled in the art can understand that the decoder 36 can also utilize other encoding/decoding schemes.

In this embodiment, when the display engine 37 reads a specific video data set from the memory block 44 of the memory 32 to drive the panel 38, the display engine 37 can, according to outlook of the specific video data set eventually being shown on the display panel 38, identify a portion of the specific video data set, and choose not to read the display data corresponding to said portion of the video data set out from the memory block 44. For example, when, due to being covered by other overlapping images in the context of a PIP, OSD, or other application, the display data corresponding to the above-mentioned portion of said video data set is not to be seen on the display panel 38, whether the display engine 37 reads out the display data corresponding to the said portion of the data set from the memory block 44 or not does not affects the display result. Therefore, in this embodiment, the display engine 37 does not read the display data corresponding to said portion of video data set from the memory block 44 through the bus 40.

For performing the above-mentioned function, as shown in FIG. 2, in this embodiment the display engine 37 has an arithmetic unit 46 and a temporary storing unit 48. The arithmetic unit 46 determines the display area corresponding to said portion of video data set according to the displaying result on the panel 38 in the context of, for example, a PIP, OSD, or other application, and temporarily stores display coordinates corresponding to the display area on the panel 38 in the temporary storing unit 48. Then, the display engine 37 utilizes the display coordinates stored in the temporary storing unit 48 to determine the display data that are not to be read out, corresponding to the display area.

Figure 3:
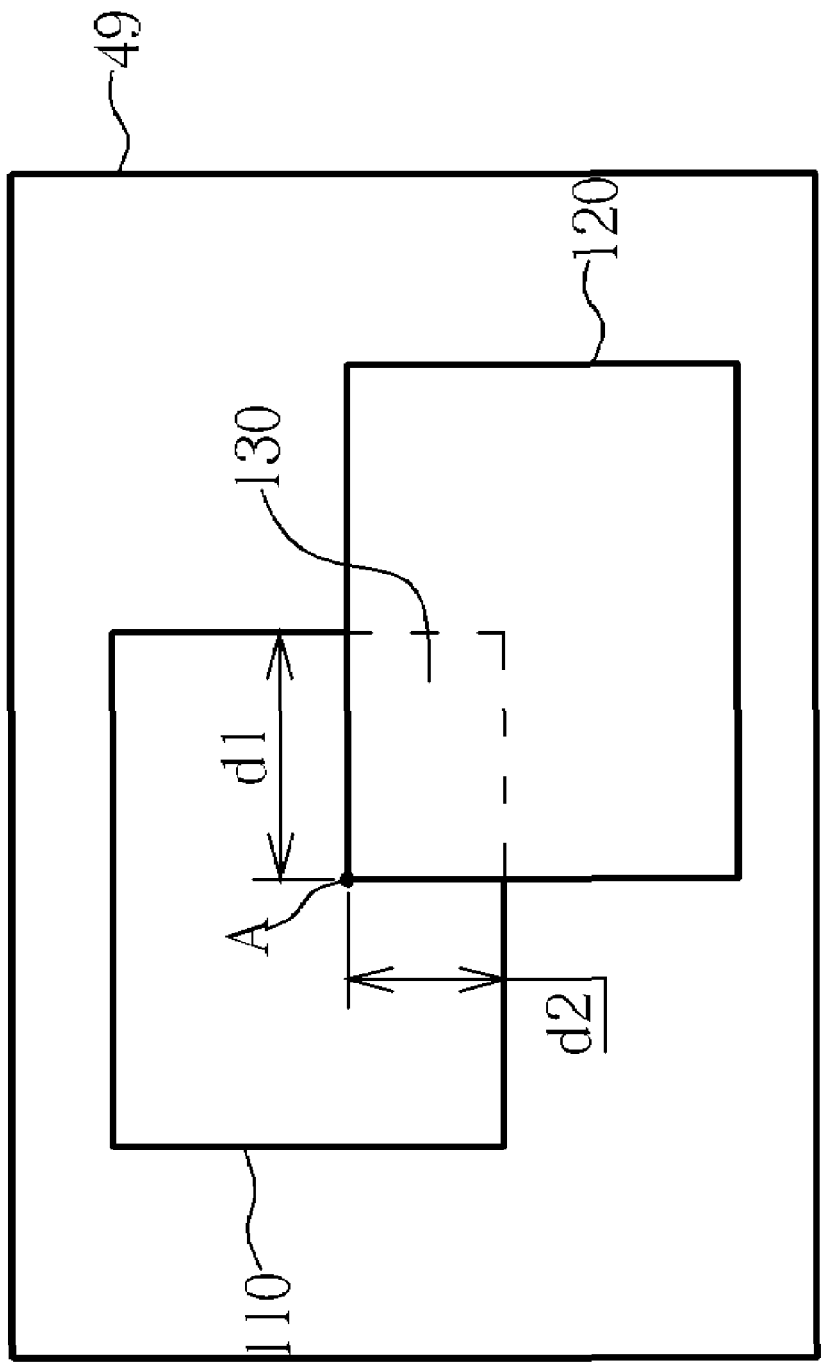
FIG. 3 is an illustration of an embodiment of the display engine shown in FIG. 2 processing a video data set.

Please refer to FIG. 2 in conjunction with FIG. 3, where FIG. 3 is an illustration of an embodiment of the display engine 37 shown in FIG. 2 processing a video data set. As shown in FIG. 3, assuming that two pictures 110, 120 are to be shown on the display panel 38, wherein the two pictures 110, 120 partially overlap with each other in a display area 130 on the panel 38, and the picture 120 is on top of the picture 110; that is, the picture 120 partially covers the picture 110 in the display area 130, for example, when the picture 120 is used to display a subtitle or an OSD image. Because the portion of the picture 110 in the display area 130 is not to be shown and seen due to the cover-up, in this embodiment the display engine 37 does not need to read the display data set corresponding to the display area 130 of the picture 110 from the memory block 44, and therefore the bandwidth used for reading the display data set corresponding to the display area 130 from the memory block 44 is spared. For example, when the display engine 37 reads the video data set corresponding to the picture 110, the arithmetic unit 46 stores the display coordinates of the display area 130 in the temporary storing unit 48. As shown in FIG. 3, pixel A lies in a corner of the display area 130 and pixel A has a horizontal display coordinate X and a vertical display coordinate Y on the display panel; furthermore, the size of the display area 130 is $d_1$ pixels horizontally and $d_2$ pixels vertically. Therefore, the arithmetic unit 46 stores the horizontal display coordinate X, the vertical display coordinate Y, the horizontal distance $d_1$, and the vertical distance $d_2$ in the temporary storing unit 48, and the display area 130 can be defined by the horizontal display coordinate X, the vertical display coordinate Y, the horizontal distance $d_1$, and the vertical distance $d_2$. In this embodiment, when the display engine 37 reads the display data set corresponding to the picture 110 from the memory block 44 to drive the panel 38, the display engine 37 reads out, according to the stored coordinate information, the required display data, which does not include the display data corresponding to the covered display area 130.

Figure 4:
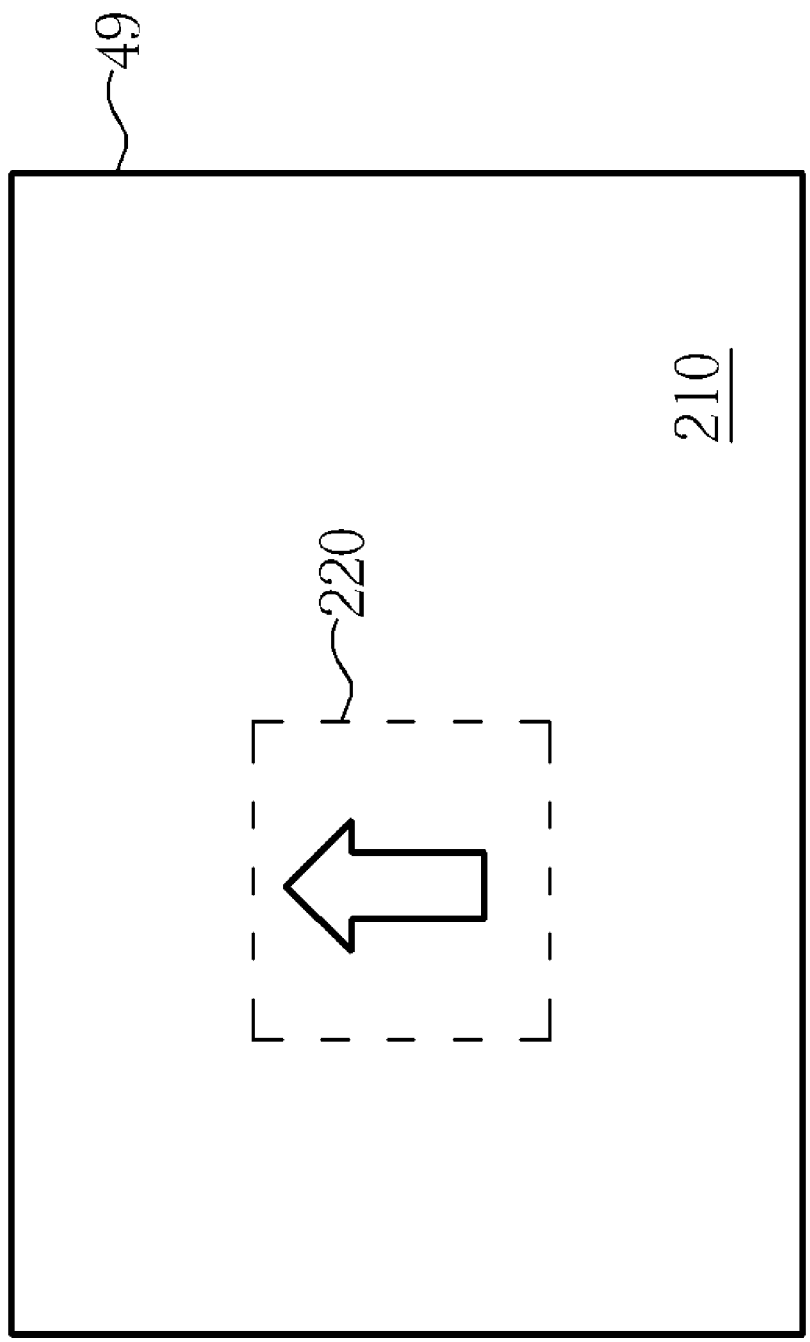
FIG. 4 and FIG. 5 are illustrations of another embodiment of the display engine shown in FIG. 2 processing a video data set.
Figure 5:
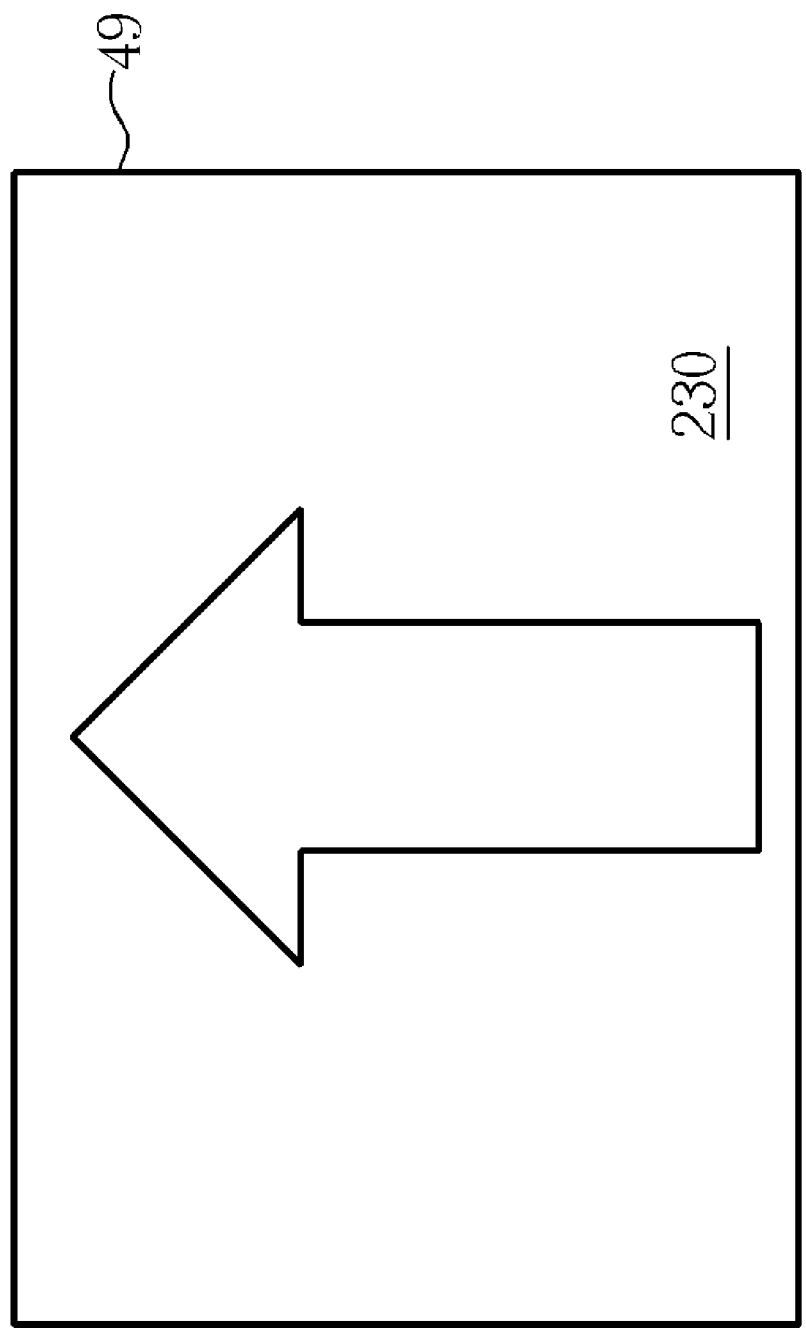

Please refer to FIG. 2 in conjunction with FIG. 4 and FIG. 5, where FIG. 4 and FIG. 5 are illustrations of another embodiment of the display engine 37 shown in FIG. 2 processing a video data set. As shown in FIG. 4, the display panel 38 shows a picture 210, wherein an area 220, which is to be closed up and is surrounded by a dotted line, is selected by a user. When the panel 38 displays the close-up area 220, as shown in FIG. 5, the panel 38 only shows a scaled up picture 230 of the close-up area 220. Therefore, when the display engine 37 drives the panel 38 to show the picture 230, the display engine 37 only needs the display data set of the selected close-up area 220 of the picture 210. As known by those skilled in the art, the display engine 37 typically comprises a scaler, which can perform operations such as interpolation, to create the display data set corresponding to the picture 230 from the display data set corresponding to the close-up area 220. Therefore, when the display engine 37 processes to produce the video data set corresponding to the picture 230, the arithmetic unit 46 determines display coordinates corresponding to the area other than the close-up area 220 and stores the display coordinates in the temporary storing unit 48. In this embodiment, after the MPEG decoder 36 decodes the video data set corresponding to the picture 210, the MPEG decoder 36 transfers the display data set of the display picture 210 to the memory block 44 through the bus 40. Since the portion of the picture 210 outside the close-up area 220 is not to be shown in the picture 230, when the display engine 37 reads the display data stored in the memory block 44, it only reads out the display data set corresponding to the picture 230 according to the display address in the temporary storing unit 48; that is, the portion other than that corresponding to picture 220 in FIG. 4 is not read.

Please note that in the above-mentioned embodiments, when the display engine 37 processes the video data set corresponding to the picture 230, the arithmetic unit 46 can also store the display coordinates of the close-up area 220 in the temporary storing unit 48 and the display engine 37 only needs to read the display data corresponding to the display coordinates instead of reading all display data from the memory block 44.

Figure 6:
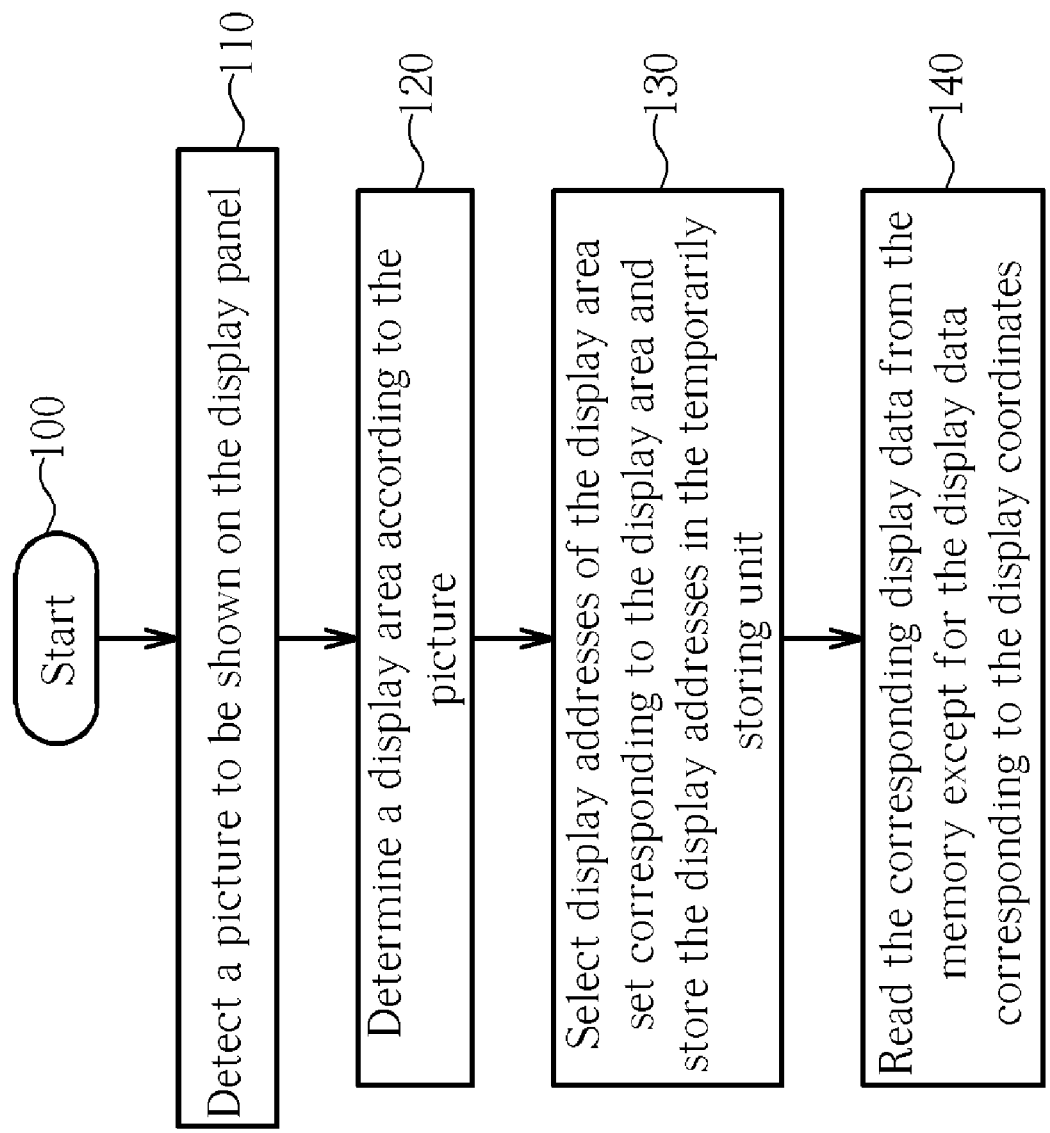
FIG. 6 is a flow chart of an embodiment of the present invention processing a video data set.

Please refer to FIG. 2 in conjunction with FIG. 6, where FIG. 6 is a flow chart of an embodiment of the present invention processing a video data. The operation by which the display engine 37 processes the video data comprises the following steps:

Step 100: Start;

Step 110: The arithmetic unit 46 detects a picture to be shown on the panel 38;

Step 120: The arithmetic unit 46 determines a display area according to the picture;

Step 130: The arithmetic unit 46 selects display coordinates of the display data set corresponding to the display area and stores the display coordinates in the temporary storing unit 48; and Step 140: The display engine 37 reads the corresponding display data from the memory block 44 of the memory 32 except for the display data corresponding to the display coordinates stored in the temporary storing unit 48.

Please note that in actual implementations, the arithmetic unit 46 and the temporary storing unit 48 can be realized within the display engine 37, or the arithmetic unit 46 and the temporary storing unit 48 can be designed externally to the display engine 37. Furthermore, in this embodiment, the display engine 37 determines whether the display data is read from the memory 36 according to the display coordinates of the selected display area stored in the temporary storing unit 48. But in fact, all mechanisms capable of determining which display data set does not need to be transferred can be utilized in this invention. That is, the present invention is not limited to utilizing the display coordinates stored in the temporary storing unit 48. For example, one embodiment can utilize the header information from a MPEG video data set to determine which video data does not need to be transferred.

In addition, in the embodiment shown in FIG. 3, the selected display area is the overlapping area 130. But a subset of the overlapping area 130 can also be the selected display area; in other words, the selected display data that does not need to be transferred may be merely a part of the display data corresponding to the entire overlapping area. Similarly, in the embodiment shown in FIG. 4 and FIG. 5, the selected display area is the whole picture except the close-up area 220, but a subset of the whole picture except the close-up area 220 can also be selected. In other words, the video data that does not need to be transferred may be merely a part of the display corresponding to the picture except the close-up area 220. That is, it does not need to be the whole display data corresponding to the picture outside the close-up area 220.

Please note that the present invention apparatus and method can be embodied in a digital TV; however, it can also be embodied in a DVD video player, a set top box, a video switch, or any other video processing systems.

It is also to be noted that although in the embodiments of the present invention only panel displays are listed as examples, one of ordinary skill in the art will be able to appreciate that the application of the inventive apparatus and method is not limited to flat panel displays. Any known or new display technologies such as CRT, LCD, plasma display, LOCOS, etc (the output illuminating mechanisms of all of which, such as the tube of CRT, or the panel of LCD, are hereinafter collectively termed as "displayer") can implement and take the advantage of the invention.

The embodiment apparatus and method can save a large amount of bus or memory bandwidth in the context of picture overlapping or a close-up picture or other similar situation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video data displaying apparatus for driving a displayer to display a first picture according to a first display data set, the apparatus comprising:
    a memory for storing the first display data set;
    an arithmetic unit, for detecting the first picture and determining a display area according to the first picture, the arithmetic unit further configured to temporarily store display coordinates corresponding to the display area; and
    a display engine coupled to the memory for selectively reading only a part of the first display data set from the memory to drive the displayer based on the display coordinates stored by the arithmetic unit, wherein the display engine selects a specific display data set of the first display data set according to a display area on the displayer, and the display data set outputted by the display engine to the displayer does not comprise the specific data set.

2. The apparatus of claim 1, wherein the memory further stores a second display data set for driving the displayer to display a second picture, and if the first picture and the second picture partially overlap in an overlapping area, the video decoder determines the display area according to the overlapping area.

3. The apparatus of claim 2, wherein the display area is a subset of the overlapping area.

4. The apparatus of claim 2, wherein the first picture is a main-picture and the second picture is a sub-picture.

5. The apparatus of claim 1, wherein the display area is a subtitle or an area where an OSD picture overlaps the first picture.

6. The apparatus of claim 1, wherein the display coordinates consists of a horizontal display coordinate, a vertical display coordinate, a horizontal distance, and a vertical distance.

7. A method of processing a video data set for driving a displayer to display a first picture according to a first display data set, the method comprising:
    storing the first display data set;
    detecting the first picture and determining a display area according to the first picture;
    selecting a specific display data set of the first display data set according to a display area on the displayer; and
    utilizing the specific display data set to selectively read only a part of the first display data set to drive the displayer to display the first picture, wherein a display data set transferred to the displayer does not comprise the specific display data set.

8. The method of claim 7 further comprising:
    storing a second display data set for driving the displayer to display a second picture, wherein the first picture and the second picture partially overlap in an overlapping area; and
    determining the display area according to the overlapping area.

9. The method of claim 8, wherein the display area is a subset of the overlapping area.

10. The method of claim 8, wherein the first picture is a main-picture, and the second picture is a sub-picture.

11. The method of claim 7, wherein the display area is a subtitle or an area where an OSD picture overlaps the first picture.

12. A display apparatus, comprising:
    a memory for storing a first set of display data;
    a display engine coupled to the memory; and
    a displayer coupled to the display engine, for displaying an image according to a control of the display engine;
    wherein the display engine detects the image to be shown on the displayer for identifying a portion of the first set of display data, and drives the displayer to display the image by reading out from the memory the first set of display data other than the identified portion by utilizing display coordinates associated with the identified portion.

13. The display apparatus of claim 12, further comprising a temporary storing unit coupled to the display engine, for storing information corresponding to the identified portion of the first set of display data.

14. The display apparatus of claim 12, further comprising a bus for communicating the memory and the display engine.

15. The display apparatus of claim 12, wherein the memory further stores a second set of display data, and first set of display data and the second set of display data overlap in the image displayed by the displayer.

16. The display apparatus of claim 15, wherein the identified portion of the first set of display data is comprised in the overlapping area in the image of the first and second set of display data.

17. The display apparatus of claim 12, wherein the first set of display data other than the identified portion being read out corresponds to a selected picture to be closed up.

18. The display apparatus of claim 12 is a digital TV controller chip.

19. The display apparatus of claim 12 is a DVD controller chip.

20. The display apparatus of claim 12, wherein detecting the image to be shown on the displayer for identifying a portion of the first set of display data is performed based on MPEG header information.

* * * * *